United States Patent [19]

Bender

[11] 4,136,207
[45] Jan. 23, 1979

[54] METHOD OF TREATING LIGNOCELLULOSE MATERIALS TO PRODUCE RUMINANT FEED

[75] Inventor: Robert Bender, Ottawa, Canada

[73] Assignee: Stake Technology Ltd., Ottawa, Canada

[21] Appl. No.: 762,095

[22] Filed: Jan. 24, 1977

[51] Int. Cl.² .......................... A23K 1/12; A23K 1/18; D21B 1/36; D21C 3/24

[52] U.S. Cl. ...................................... 426/510; 162/18; 162/21; 162/68; 426/447; 426/455; 426/807

[58] Field of Search ............... 426/635, 636, 447, 453, 426/454, 455, 456, 465, 472, 481, 510, 511, 512, 520, 523, 807; 162/18, 21, 68; 127/37

[56] References Cited

U.S. PATENT DOCUMENTS

| | | | |
|---|---|---|---|
| 2,673,690 | 3/1954 | Segl | 162/18 |
| 2,723,194 | 11/1955 | Birdseye | 162/21 X |
| 2,943,012 | 6/1960 | Dunning et al. | 162/18 |
| 3,212,932 | 10/1965 | Hess et al. | 426/807 X |
| 3,817,786 | 6/1974 | Algeo | 426/807 X |
| 4,001,452 | 1/1977 | Williams | 426/807 X |

FOREIGN PATENT DOCUMENTS

| | | | |
|---|---|---|---|
| 459231 | 8/1949 | Canada | 162/21 |
| 1960877 | 6/1971 | Fed. Rep. of Germany | 426/636 |

*Primary Examiner*—Arthur L. Corbin
*Attorney, Agent, or Firm*—Cushman, Darby & Cushman

[57] ABSTRACT

Lignocellulose material is mechanically compacted and subjected to sudden pressure increase by exposure to saturated steam in a digestor vessel in the absence of added chemical reagents to obtain a cooked material which is then mechanically compacted while under said saturated steam pressure. Small portions of the cooked and mechanically compacted material are thereafter subjected to rapid reduction in pressure down to atmospheric pressure and then recovered in a condition of enhanced digestibility by ruminants.

8 Claims, 1 Drawing Figure

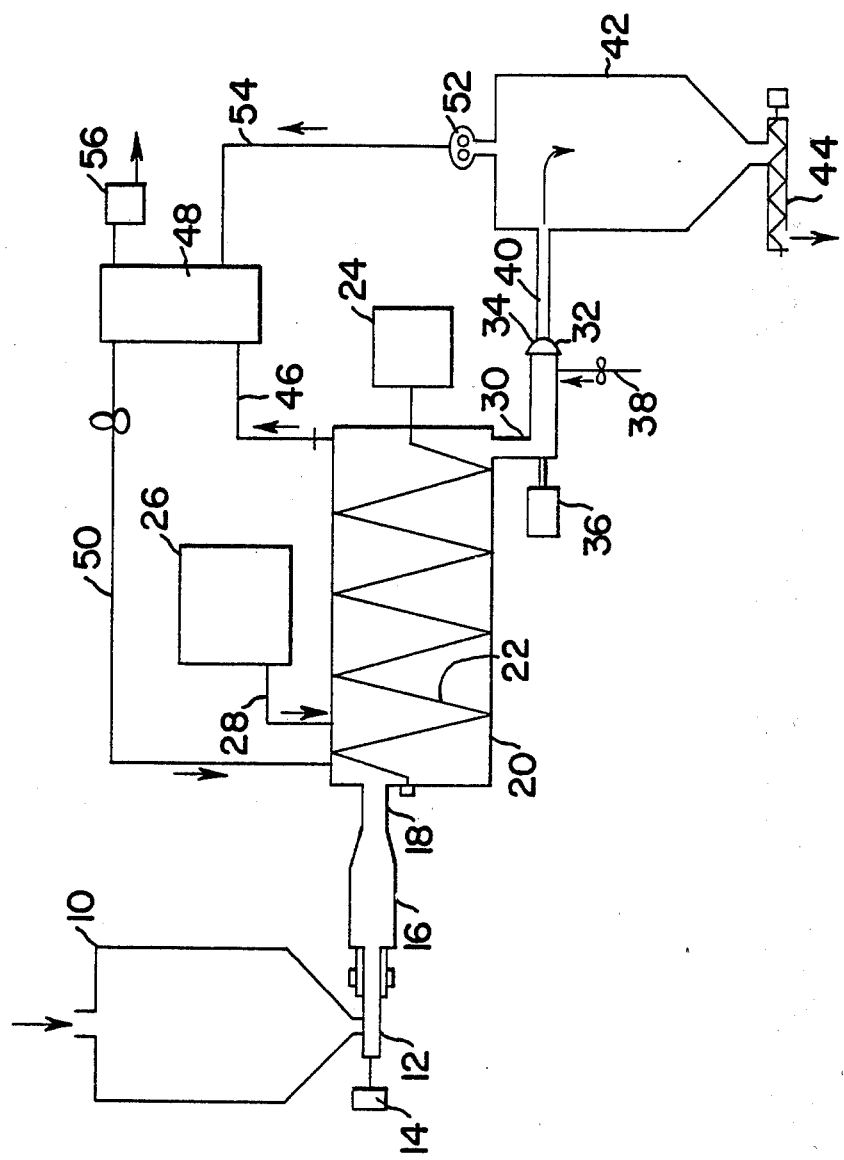

4,136,207

METHOD OF TREATING LIGNOCELLULOSE MATERIALS TO PRODUCE RUMINANT FEED

FIELD OF THE INVENTION

This invention relates to the treatment of ligno-cellulose materials to prepare a cellulose product which is digestible by ruminants.

BACKGROUND OF THE INVENTION

Ruminants such as cattle, sheep and goats can feed upon and digest cellulose obtained from a variety of plant sources such as grasses, due to the presence in the rumen of the animal of cellulolytic enzymes. However, the ability of the cellulolytic enzymes to degrade cellulose varies considerably according to the nature and origin of the cellulose containing substrate. Ruminants cannot digest ligno-cellulose materials such as untreated wood, for example. Untreated wood contains lignin, hemicelluloses and cellulose. When lignin is removed, the remaining cellulose product is readily and completely digestible by the ruminant. Considerable effort has been expended in the past by animal nutritionists and others to devise economical ways in which low grade forage such as wood can be rendered digestible by ruminants.

The reasons for the indigestibility of ligno-cellulose materials, such as wood, by ruminants are not fully understood, and do not appear to be based upon any single or simple factor. Complete or partial removal of lignin from the ligno-cellulose material is not necessary. Lignin itself is not a toxic or harmful substance for the ruminant to eat. It appears to be of no nutritional value to the animal. If eaten, it passes through and is excreted by the animal in substantially unchanged form. Delignification of wood so as to provide cellulosic animal fodder is an uneconomic proposition, firstly because of the energy and chemicals needed in the delignification process itself, and secondly because of the problems of the disposal of the essentially useless and potentially pollutant lignin materials so obtained. It has been suggested that the physical or chemical form of the cellulose when in association with lignin in a ligno-cellulose material is responsible for its indigestibility by ruminants. Thus, the cellulolytic enzymes may have difficulty gaining the necessary access to the cellulose molecules to degrade them chemically, in ligno-cellulose material. This could be as a result of the lignins forming a physical barrier to access to the cellulose molecules. Alternatively, it could be that the cellulose assumes a condition of increased crystallinity, or decreased surface area, or increased molecular chain length when in association with lignin in a ligno-cellulose material, any of which conditions could inhibit the cellulolytic enzyme attack on the cellulose for digestion by the ruminant.

There is a great incentive to provide ruminant fodder derived from ligno-cellulose material, due to the abundant availability of ligno-cellulose material, much of which is not useful for other economical purposes. However, it is very important that any process for rendering ligno-cellulose material suitable for animal fodder be economical to operate on a commercial scale, since the end product must presently compete with other low cost aminal feed products.

BRIEF DESCRIPTION OF THE PRIOR ART

There are reports in scientific and patent literature of many attempts to develop processes for producing animal fodder for ruminants from ligno-cellulose material, but none has met with significant commercial success to date. Most of these have involved some form of chemical treatment of the ligno-cellulose material. Thus, U.S. Pat. No. 3,939,286 Jelks, discloses treating plant material such as tree trunk wood with acid and a metal catalyst, and then oxidizing it under oxygen pressure. U.S. Pat. No. 3,212,932 Hess et al., discloses a multi stage selective hydrolysis process in which ligno-cellulose is treated with mineral acid and subjected to high pressures of steam. U.S. Pat. Nos. 3,667,961 and 3,817,786 Algeo both disclose a process in which ligno-cellulose material, on a batch basis, is subject to very high pressure steam, and then released, this process requiring the use of very large quantities of steam, and very high pressure equipment, and hence being expensive to operate on a commercial scale. U.S. Pat. No. 3,910,505 Reinhall discloses a process in which ligno-cellulose material is preheated and then mechanically ground under superatmospheric pressure. All of these processes suffer from the same serious disadvantage that they are uneconomic to operate, and do not give a satisfactory animal fodder product which can be marketed at a competitive price.

BRIEF SUMMARY OF THE INVENTION

An object of the present invention is to provide an economic animal fodder derived from ligno-cellulose material, of enhanced digestibility by ruminants.

Another object is to provide a novel process for enhancing the ruminant digestibility of ligno-cellulose material.

Another object is to provide a continuous process of preparing ruminant fodder in relatively high yield from ligno-cellulose material, which can be operated economically, without the use of large power generating facilities, and without the addition of chemical reagents.

Other objects and advantages of the present invention will be apparent from the following description.

According to the present invention, ligno-cellulosic material such as aspen poplar wood, having a moisture content at or above the fibre saturation point, is mechanically compacted and then abruptly subjected to saturated steam at elevated pressures, suitably in a digester vessel. The ligno-cellulosic material is cooked by the saturated steam at a given pressure of at least 200 psig and for a time of at least 15 seconds. Prior to discharge from the digester at the end of the cooking process, the ligno-cellulosic material is mechanically compacted, its free moisture content is maintained at or adjusted to at least the fibre saturation point, and then subjected to rapid release of pressure and consequent cooling, adiabatically, a small portion at a time.

It has been found that an important feature in obtaining a reasonably high yield of ruminant digestible material from ligno-cellulosic material, in an economically attractive process, is the avoidance of substantial overcooking of the material, and the avoidance of overheating the material. If overheating occurs, even locally within the mass of material, before or after the steam cooking step, the yield of digestible material formed is materially reduced.

The process of the present invention accomplishes this, to a practical degree, by the special procedures adopted in feeding the material to and discharging the material from the digester vessel. For feeding, the material is at or above the fibre saturation point in moisture content and is mechanically compacted. When it is then suddenly and abruptly subjected to the saturated steam, at elevated pressures and temperatures, it promptly "relaxes" or de-compacts, permitting prompt and thorough steam penetration thereof, throughout the mass of the material. This steam penetration, along with the presence of sufficient free water in the material to assist in heat dissipation, prevents local overheating which might otherwise occur. It allows cooking to commence promptly without a gradual rise of the material to cooking conditions, so that cooking times are more easily controlled.

Similarly on exit from the digester, the material is first mechanically compacted and its free water content maintained at least at the fibre saturation level. Small batches thereof are then rapidly, in a period of no greater than 0.1 seconds, decompressed and cooled by adiabatic expansion, to ambient conditions. In this way, local overheating is again avoided, since heat inevitably generated on expansion of the material is dissipated by the water in the material, and time of contact with possibly superheated apparatus surfaces during this expansion is reduced.

The process of the invention can be operated continuously or semi-continuously in an economical fashion to produce relatively high yields of digestible product. The use of chemical reagents is avoided, but nevertheless high pressures and temperatures of saturated steam are unnecessary. The lignin material is left in the final product, so that expensive disposal of this potential pollutant is avoided. In fact, saturated steam pressures below 1250 psig, or even below the 300–600 psig range, can readily be employed in the process, with the consequent savings on high pressure equipment costs and energy requirements.

DESCRIPTION OF THE PREFERRED EMBODIMENTS

It is preferred that the ligno-cellulose material, at the start of the process should be in a relatively finely divided form, such as chips or sawdust. This is desirable firstly from the standpoint of the ease of mechanical handling, to introduce the material efficiently into the processing apparatus, and secondly from the standpoint of heat transfer. In the process according to the invention, cooking temperatures should be reached very rapidly by the material, and a small particle size material is clearly advantageous in this respect. Particle sizes of material from the finest sawdust up to the largest sized wood chips commonly available from commercial sources, i.e., up to about 4 inches longest dimension, can be used satisfactorily.

As noted, the moisture saturated ligno-cellulose material is mechanically compacted prior to its introduction into the digester. Besides arranging for the desired decompaction and prompt steam penetration in the digester, as previously discussed, this mechanical compaction affords another significant advantage in the process, namely removal of substantial quantities of air from the material prior to its introduction into the digester. Presence of air in the digester during cooking should be minimized. Oxygen will tend to oxidatively degrade the material if present during the cooking step and this will decrease the yield of digestive material. Further, air in the digester will exert a partial pressure, so that when the digester is being run on automatic pressure control by saturated steam pressure regulation, as is most convenient and desirable, the air partial pressure will have the effect of decreasing the steam pressure, and hence the temperature in the reactor, below the desirable preselected value.

In addition, the compaction of the material followed by its subsequent sudden subjection to cooking conditions can cause a degree of fibrillation of the material. This is desirable, as assisting in the heat transfer within and around the material.

The process according to the present invention is preferably conducted on a continuous or semi-continuous basis, with the reaction vessel kept pressurized with steam to the desired level in the 200–600 and preferably in the 200–310 psig. range, and ligno-cellulose material being fed continuously or intermittently to the reaction vessel. This adds very considerably to the economy with which the process of the invention can be operated, since it avoids repeated pressurizing and depressurizing of the reactor with steam with consequent excessive consumption of power.

A preferred method of introduction of the material into the reaction vessel is to precompact the fibrous ligno-cellulose material mechanically to form a solid plug thereof, e.g. in an inlet conduit or housing, feeding into the pressurized reaction vessel. The density of the plug can be made high enough by compression that, as it is fed into the reactor, filling the inlet thereto, loss of steam pressure through the reactor inlet is substantially avoided. Furthermore, as the mechanically compacted material enters into the reaction vessel and encounters the steam cooking environment, it expands and relaxes. This allows substantially instantaneous steam penetration of the fibrous material to commence the cooking, and thus permits better control of cooking times. The structure and operation of a suitable, preferred inlet feed arrangement is described in our copending U.S. patent application Ser. No. 762,094, filed on even date herewith.

After introduction into the reaction vessel, the material is cooked at the aforementioned steam pressures for a period of at least 15 seconds, and preferably for at least 5 minutes. The maximum length of time for which the material is cooked is about 1 hour, and is dictated to a large extent by the economic conditions. Preferably the cooking time is no longer than about 20 minutes. Continuing the cooking process for longer periods may lead to some overcooking of the product and so should be avoided. The optimum cooking time is dependent to some extent upon the precise steam pressure which is used in the cooking process. At the lower end of the pressure range, longer times within the aforementioned ranges are preferred, and vice versa. Optimum times of cooking also depend to some extent upon the nature of the ligno-cellulose material and the particulate size of the material at the time it is introduced into the reaction vessel.

It will be appreciated that it is not necessary to specify temperatures of the cooking conditions within the reactor. These are in fact fixed by the saturated steam pressures as specified herein, due allowance being made for the partial pressure of volatiles generated by the cooking process within the digester, since as is well known saturated steam at a given pressure has a given temperature, which can be read from standard physical constant tables. It is convenient to refer only to gauge pressures because these are so simply read by means of a pressure gauge connected to the reactor. Fluctuations of up to 20 psig during operation of the reactor are commonly experienced. In the preferred, continuous or semi-continuous process according to the present invention, steam is supplied to the reactor automatically to maintain the steam pressure in the reactor at the predetermined, desired level. Preferred steam pressures for operating according to the present invention are in the range 210–250 psig. The ability to operate at steam pressures not in excess of about 310 psig is a very important factor in the economical operation of the process of the invention. Specially designed equipment and apparatus features have to be adopted, which are expensive, if pressures higher than about 310 psig are used.

In the process of the present invention, the material after cooking is cooled and depressurized substantially instantaneously, and whilst in a moisture saturated condition. This is preferably done by subjecting a small portion of the moisture saturated material to sudden and substantially instantaneous decompression and adiabatic expansion, e.g., by discharging the small portion from the heated, pressurized reactor into ambient conditions, followed by the similar discharge of another similar small portion after a short interval, and so on. Operation in this manner ensures that all of the material at the conclusion of the process experiences the same even and substantially instantaneous pressure drop experienced after cooking, but in small successive portions. This is important in enhancing the quality of the product so formed. The cooking process is substantially instantaneously stopped with respect to each small portion of material being discharged, thereby allowing close control of the cooking process. This process helps to ensure a uniform degree of cooking, to give a uniform product, as opposed to a batch process where a large part of, or even an entire, reactor charge might be depressurized at once. In such a large scale, mass decompression, even treatment and substantially instantaneous decompression of all the material within the mass cannot be accomplished, and local overheating within the mass cannot be avoided.

A suitable apparatus for effecting the decompression of successive small portions of the material according to the invention comprises a throttle valve having a throat therethrough which can be arranged to form a narrow restricted outlet from the interior of the reactor. The valve is opened intermittently and for a brief interval, to allow a small portion of material to be expelled therethrough accompanied by substantially instantaneous adiabatic expansion of the small amount of material on discharge. A preferred form of the apparatus is a rotatable valve with a narrow throat therethrough, located in an exit conduit from the reactor, and rotatable at preset intervals from the closed to the open position.

As noted, a degree of mechanical compaction of the material in the reactor at the location of the throttle valve is achieved. This can be achieved by provision of a mechanical compaction device in the outlet conduit from the reactor, such as a reciprocating plunger or screw feeder, operated by driving means from outside the apparatus. Such mechanical compaction not only ensures the necessary instantaneous discharge of the portion of material on opening the valve, but helps prevent steam losses through the valve as it is opened. Further, it helps to ensure that the time of contact of the material with the side walls of the valve throat is extremely small, so that local overheating of the product by the valve side walls will not occur. It will be appreciated that the discharge valve will of necessity become heated during the operation of the process, with discharging material moving through it at very high speeds.

Further to ensure against local overheating of the product on discharge, the product should have a moisture content at or above the fibre saturation level, i.e., at least 40%, at the time of discharge.

If necessary, water is added to the material immediately prior to discharge so as to provide mechanically free water in admixture with the product. The water can be cold water, so as to assist in quenching the product on discharge. The material is compacted and contains steam at the time of discharge. As it is discharged into atmospheric conditions, it suddenly expands due to the release of pressure. The work done by the material on expansion will generate heat. The moisture present in the moisture saturated material will help to absorb and dissipate the heat so generated, and hence prevent local overcooking of the material on discharge to the detriment of its digestibility. This actual expansion and decompression is conducted adiabatically.

On discharge and instantaneous decompression as described, defibration of the product occurs, and the product is in the form of moist fibre bundles. This is desirable from the point of view of animal acceptability. It is substantially free from potentially injurious wood slivers. It can be re-compacted if desired, for reduction of bulk ready for transportation, in brick or bale form. The decompressive force on the material upon discharge can be used to convey the material to suitable storage bins and other vessels.

BRIEF REFERENCE TO THE DRAWING

The accompanying drawing illustrates diagrammatically the process and apparatus of the preferred form of the invention.

DESCRIPTION OF THE SPECIFIC PREFERRED EMBODIMENT

In the process according to the specific preferred embodiment of the invention, the raw ligno-cellulose material, in chip or dust form, is fed to a hopper 10, in which it is maintained in a moist condition. The material exits from the bottom of the hopper 10 into a conveying feeder 12 which contains a feed screw driven by a variable feed drive 14. The feed screw feeds the material into a compacting feed tube 16 and thence into a pressurized retention tube 18 where it is formed into a solid plug of material, in which the material is compressed by surface pressures of up to 2,000 p.s.i.

The retention tube 18 communicates with a pressurized reaction vessel 20 which contains a helical screw conveyor 22 driven for rotation and conveyance by a variable speed drive 24. Steam at pressures from 200–310 p.s.i. is fed to reaction vessel 20 from steam generator 26 via steam line 28. Suitable pressure gauges and valves are included in line 28 to monitor and maintain the steam pressures in the reaction vessel 20. The compacted plug of material in retention tube 18 effectively prevents escape of steam through the inlet. As the material is fed continuously into reactor vessel 20, it experiences sudden increase in temperature and pressure, being suddenly subjected to the steam pressure cooking conditions in vessel 20.

The material exits from vessel 20 to an outlet conduit 30, at the downstream end of which is a throttle valve 32. The throttle valve 32 is in the form of a rotatable block having a narrow throat 34 therethrough, the block being rotatable between an open position in which the throat 34 lines up with outlet conduit 30 to allow discharge of material therethrough, and a closed position in which exit from outlet conduit 30 is closed off. Throttle valve 32 is rotated between its open and closed position intermittently at preselected intervals, to allow discharge of small portions of material at a time, from outlet conduit 30. In the outlet conduit 30 is located a compactor, in the form of a helical screw conveyor, driven by a fixed speed drive 36 to compact material ahead of throttle valve 32. A water inlet line 38 is provided communicating with outlet conduit 30 ahead of throttle valve 32, at a location where the material is in its compacted form.

Downstream of the throttle valve 32 is a low pressure exit tube 40, through which discharged material from valve 34 is delivered to a bin 42, and is thence conveyed by a conveyor 44 to storage or packaging, etc.

The vessel 20 is provided with a valved vent line 46, communicating with a byproduct recovery column 48, in which volatile, useful byproducts such as furfural from the steam pressure cooking process can be separated and recovered. Steam which may collect in the byproduct recovery column 48 is returned via line 50 to the vessel 20. Similarly, bin 42 is provided with a blower 52 and a vent line 54, by means of which volatiles given off by the product on discharge can be returned to the byproduct recovery column 48. A condenser 56 is provided to collect and condense the useful byproducts from the column 48.

EXAMPLE 1

Animal feed material was prepared by a process according to the present invention, from aspen poplar wood, and then fed to animals and its digestibility evaluated.

Aspen poplar chips derived from whole tree material, including the tree bark, were prepared according to normal commercial practice. The material contained principally trempling aspen with minor amounts of other species of poplar. Chip size and size distribution was "millrun." The size of the chips is "past 2 inch," fines included. The moisture content of the chips was consistently within 2½% of 50%, and therefore well above the fibre saturation point.

The above material was cooked with steam in an apparatus as previously described and outlined. Cooking apparatus included an inlet conduit having a screw feeder device, a digester containing a internal helical conveyor and being capable of withstanding steam pressures, and an outlet conduit containing a helical compactor and a rotary throttle valve.

The chips were introduced into the digester by the screw feeder device in the inlet conduit, which formed a steam impermeable plug and continuously advanced material into the cavity of the digester. A small amount of water and solubles is expelled from the wood in the feeding operation. The digester containing the internal helical conveyor was operated in a partially full condition, with respect to its volumetric size. Accordingly, as it entered, the wood chips expanded from the steam-type plug into a relaxed form of lower bulk density. This enables good steam penetration, on a substantially instantaneous basis. Such a rate of steam was introduced into the digester continuously, and as required to maintain the preset pressure of 230 psig as read by the gauge. Flow of steam to the digester from the steam source was assured by arrangement of a slight pressure differential therebetween.

Retention time of the material in the pressure vessel was set to be equal to six minutes, with the operation being conducted on a practically continuous basis. The discharge of the material from the digester was intermittent, by rotation of the throttle valve, and was set to be 2.5 lb. portions every 30 seconds. As a consequence of this intermittent discharge, the actual retention time of material in the vessel ranges from 6 minutes to 6.5 minutes. As discharged, the material was in a fibrillated form, due to the rapid expansion of the steam on discharge, and contained 47±2% moisture.

The product was fed to animals in the same form as it exited from the digester, namely a loose bulky material of moderate moisture content. The material was brown in appearance and smelled of acidic components produced in the course of the cooking. The product was fed to sheep and cattle at ration levels from 10% to 90% of matter inclusion.

Analysis of the composition of the lignocellulose material, both before and after its steam treatment by the process described above, was conducted by normal procedures, and the following results were obtained:

| FEED ANALYSIS | Untreated Aspen Poplar Wood | Product of Example 1 |
| --- | --- | --- |
| pH | 6.10 | 3.60 |
| Moisture Content, % | 50.40 | 55.66 |
| Dry Matter, % | 49.60 | 44.44 |
| Crude protein, % of dry matter | 0.93 | 0.93 |
| Digestible protein, % of dry matter | 0.66 | 0.66 |
| Fiber, % of dry matter | 70.25 | 50.83 |
| Crude Carbohydrates, % of dry matter | 26.50 | 46.16 |
| Digestible carbohydrates, % of dry matter | 20.94 | 36.47 |
| Calcium, % of dry matter | 0.666 | 0.370 |
| Phosphorus, % of dry matter | 0.050 | 0.030 |
| Potassium, % of dry matter | 0.250 | 0.150 |
| Magnesium, % of dry matter | 0.291 | 0.042 |
| Sodium, % of dry matter | 0.016 | 0.010 |

Noteworthy among the above results are the fact that the amount of crude protein remains unchanged by the process of the invention, whilst the fiber content is much reduced and the carbohydrate content, crude and digestible is much increased. It is also to be noted that the acidity of the product, and its moisture content, increase, whilst the amounts of trace elements are not significantly changed.

The product of Example 1 was also subjected to in vitro testing to determine the percentage digestibility thereof. The process described in the example was conducted over a period of several days, and samples were taken periodically over an eight day period, and individually analysed for percentage in vitro digestibility (IVD). The analytical method used was that of Tilley and Terry, "An in vitro rumen technique for dry matter evaluation of forages," as modified by G. I. Prichard and A. MacIntosh, Contribution 195, Canadian Department of Agriculture, 1964.

The IVD of the dry matter of the product of example varied between 50.7% and 57.3% for the samples tested (19 samples in all) with the average value being 54.5%.

It will of course be understood that the scope of the invention is not to be construed as limited to the precise embodiments described herein in detail, but is limited only by the scope of the appended claims.

I claim:

1. A process for preparing cellulosic material of enhanced digestibility by ruminants, which comprises the steps of:

initially mechanically compacting a lignocellulose material selected from the group consisting of hardwood wood chips and sawdust, said lignocellulose material having a moisture content at or above the fiber saturation point:

continuously feeding the compacted lignocellulose material to a pressure withstanding digestor vessel;

subjecting said compacted lignocellulose material to sudden increase in pressure by exposure to saturated steam, at a pressure of at least 200 psig, in said digestor vessel;

conveying said lignocellulose material through said digester vessel while maintaining said lignocellulose material in contact with saturated steam, at a pressure of at least 200 psig for a period of at least 15 seconds, and in the absence of added chemical reagents other than said steam whereby a cooked and digested ligno-cellulose materials is obtained;

mechanically compacting the cooked and digested lignocellulose material while under said saturated steam pressure of at least 200 psig and adjusting or maintaining the free moisture content thereof at or above the fiber saturation point;

subjecting small portions of the cooked and digested and mechanically compacted lignocellulose material successively in a continuous manner to rapid reduction in pressure down to atmospheric pressure in a time interval of not more than 0.1 secs. resulting in cooling of said material; and then continuously recovering said lignocellulose material in a condition of enhanced digestibility by reminants.

2. The process of claim 1, wherein subjection of the small portions of the cooked and digested and mechanically compacted lignocellulose material to rapid reduction in pressure is accomplished on discharge of the material from the digestor vessel.

3. The process of claim 2, wherein saturated steam pressures in the range of 200–310 psig are maintained in the digestor vessel continuously during feeding material to and discharging material from said vessel.

4. The process of claim 3, wherein the lignocellulose material is initially at its entrance to the pressure withstanding digestor vessel to form a dense, compact plug of material.

5. The process of claim 3, wherein said small portions of lignocellulose material are discharged through a narrow, intermittently opening throttle valve into ambient temperature and pressure conditions.

6. The process of claim 5, wherein the lignocellulose material has a moisture content of at least 40% at the time of discharge.

7. The process of claim 3, wherein the lignocellulose material is aspen poplar wood.

8. The process of claim 7, wherein the lignocellulose material is subjected to saturated steam pressures in the range from about 210 to about 250 psig for about 5 to about 20 minutes in said digestor vessel.

* * * * *